United States Patent [19]

Alcorn et al.

[11] Patent Number: 5,012,163

[45] Date of Patent: Apr. 30, 1991

[54] METHOD AND APPARATUS FOR GAMMA CORRECTING PIXEL VALUE DATA IN A COMPUTER GRAPHICS SYSTEM

[75] Inventors: Byron A. Alcorn, Ft. Collins; Robert W. Cherry, Loveland; Mark D. Coleman, Fort Collins; Brian D. Rauchfuss, Fort Collins; Gary L. Taylor, Fort Collins, all of Colo.

[73] Assignee: Hewlett-Packard Co., Palo Alto, Calif.

[21] Appl. No.: 495,235

[22] Filed: Mar. 16, 1990

[51] Int. Cl.[5] .......................... G09G 1/04; H04N 5/202; H04N 9/69; G06F 15/00

[52] U.S. Cl. .......................... 315/383; 315/367; 358/164; 358/32; 364/521

[58] Field of Search .................. 315/383, 367; 358/32, 358/164; 340/728; 364/521

[56] References Cited

U.S. PATENT DOCUMENTS

| | | | |
|---|---|---|---|
| 4,786,968 | 11/1988 | Kutner | 358/164 |
| 4,808,984 | 2/1989 | Trueblood et al. | 340/728 |

*Primary Examiner*—Gregory C. Issing
*Attorney, Agent, or Firm*—Guy J. Kelley

[57] ABSTRACT

Methods and apparatus for providing pixel brightness correction in monitors. The methods and apparatus disclosed herein provide significant cost reductions in gamma correction circuitry by first degamma correcting pixel value data stored on a frame buffer, and then gamma correcting the degamma corrected pixel value data before the data is stored back on the frame buffer. Circuits for providing pixel brightness correction in a monitor comprise logic circuits for generating upper bits of a data word representing pixel intensity, shifter circuits interfaced with the logic circuits for generating lower bits of the data word representing pixel intensity, and combining circuits interfaced with the logic circuits and the shifter circuits for generating intermediate bits of the data word representing pixel intensity.

27 Claims, 3 Drawing Sheets

METHOD AND APPARATUS FOR GAMMA CORRECTING PIXEL VALUE DATA IN A COMPUTER GRAPHICS SYSTEM

FIELD OF THE INVENTION

This invention relates to methods and apparatus for rendering graphics primitives to frame buffers in computer graphics systems. More specifically, this invention relates to methods and apparatus for providing linear responses on display devices in computer graphics frame buffer systems.

BACKGROUND OF THE INVENTION

Computer graphics workstations can provide highly detailed graphics simulations for a variety of applications. Engineers and designers working in the computer aided design (CAD) and computer aided manufacturing (CAM) areas typically utilize graphics simulations for a variety of computational tasks. The computer graphics workstation industry has thus been driven to provide more powerful computer graphics workstations which can perform graphics simulations quickly and with increased detail.

Modern workstations having graphics capabilities generally utilize "window" systems to organize graphics manipulations. As the industry has been driven to provide faster and more detailed graphics capabilities, computer workstation engineers have tried to design high performance, multiple window systems which maintain a high degree of user interactivity with the graphics workstation.

A primary function of window systems in such graphics systems is to provide the user with simultaneous access to multiple processes on the workstation. Each of these processes provides an interface to the user through its own area onto the workstation display. The overall result for the user is an increase in productivity since the user can then manage more than one task at a time with multiple windows displaying multiple processes on the workstation.

In graphics systems, some scheme must be implemented to "render" or draw graphics primitives to the system's screen. "Graphics primitives" are a basic component of a graphics picture, such as a polygon or vector. All graphics pictures are formed with combinations of these graphics primitives. Many schemes may be utilized to perform graphics primitives rendering.

The graphics rendering procedure generally takes place within a piece of graphics rendering hardware called a "frame buffer." A frame buffer generally comprises a plurality of video random access memory (VRAM) computer chips which store information concerning pixel activation on the system's display screen corresponding to the particular graphics primitives which will be traced out on the screen. The frame buffer contains all of the pixel activation data and stores this information until the graphics system is prepared to trace the information on the workstation's screen. The frame buffer is generally dynamic and maintains pixel data for periodic monitor refreshing.

Thus, computer graphics systems convert image representations stored in the computer's memory to image representations which are easily understood by humans. The image representations are typically displayed on a cathode ray tube (CRT) device that is divided into arrays of pixel elements which can be stimulated to emit a range of colored light. The particular color of light that a pixel emits is called its "value." Display devices such as CRTs typically stimulate pixels sequentially in some regular order, such as left to right and top to bottom, and repeat the sequence 50 to 70 times a second to keep the screen refreshed. Thus, some mechanism is required to retain a pixel's value between the times that this value is used to stimulate the display. The frame buffer is typically used to provide this "refresh" function.

Typical CRT devices for use with graphics workstations are "raster scan" display devices. Typical raster scan display devices generate images which are a multiplicity of parallel, non-overlapping bands of pixels comprising sets of parallel lines. An example of such a system is disclosed in U.S. Pat. No. 4,695,772 to Lau et al wherein the raster scan device is organized as an array of tiles.

Raster scan devices generally utilize a multiplicity of beams for the red, green and blue (RGB) channels in the CRT. The multiplicity of beams generally write from the left side of the display CRT to the right side of the display CRT. For the purposes of dividing the CRT into tiles (a process called "tiling"), each tile is considered to comprise a height or resolution equal to the multiplicity of scan lines, with each tile being a particular number of pixels wide. The resulting graphics primitive image thus comprises a multiplicity of parallel, non-overlapping sets of parallel lines of pixels generated by a separate sweep of electron beams across the CRT screen. The tiles are generally rectangular, and organize the image into arrays having a plurality of rows by a set number of columnar tiles as described in U.S. Pat. No. 4,695,772, to Lau et al., col. 4, lines 12-17.

All CRT monitors are non-linear in brightness. This means that doubling the voltage applied by the CRT monitor will not double the brightness of the associated pixel. However, graphics workstations usually require linear responses from the monitors to comply with pixel intensity assumptions made by rendering algorithms in software. Thus, a conversion circuit has been included in most modern graphics workstations to provide linear responses on the graphics monitors. This conversion circuit is called a "gamma" correction circuit. The gamma correction circuit is designed to satisfy the following equation:

$$V=I$$

where V is the voltage applied to the monitor, I is the desired intensity, and ° is a constant which depends on the monitor type.

In some prior graphics workstations, gamma correction is accomplished with a read-only memory (ROM) table which is located immediately before the frame buffer. The ROM table contains gamma correction values for the particular intensity desired and voltage applied. However, in modern workstations requiring compositing and complex texture mapping of pixels, a simple ROM look-up table to gamma correct a monitor before the frame buffer does not allow compositing which is generally denoted as the combination of new pixel value data with pixel value data already present in the frame buffer. Since compositing operations like antialiasing and texturing require linear values, gamma correction must be done before these operations are performed on pixels to be rendered to the frame buffer in order to maximize the effective number of colors contained in the pixel value data. This highly desirable result has not heretofore been achieved in the computer workstation art and there is a long-felt need in the computer workstation art for fast gamma functions to perform gamma correction before pixel value data is stored on the frame buffer. Furthermore, present ROM gamma correction tables are slow and require many computer work cycles to complete gamma correction.

In many other prior art graphic workstations, gamma correction is accomplished with a random access memory (RAM) color look up table for pixel brightness. The disadvantages of this method and apparatus is that RAM color look up tables do not allow for data compression. Also, since the color look up table is used for the gamma function, not only is it required, but it cannot be used for other things. The present invention does not require a color look up table and thus allows the color look up table to be eliminated or to be used for other purposes.

There is therefore a long-felt need in the art for a graphics frame buffer system which provides gamma correction of pixel value data before the frame buffer in order to accommodate all of the complex graphics primitives manipulations available to a graphics workstation. Furthermore, there is a long-felt need in the art for graphics frame buffer systems which have linear monitor responses. The aforementioned long-felt needs have not heretofore been solved in the computer graphics art.

SUMMARY OF THE INVENTION

Circuits provided in accordance with the present invention solve the aforementioned long-felt needs in the art for fast gamma correction of pixel value data. Furthermore, methods and apparatus provided in accordance with the present invention reduce computer operating time by allowing complex compositing operations to occur, and yet provide linear monitor response to support the operations in computer graphics frame buffer systems. The present invention reduces the cost and/or increases the performance of a graphics workstation.

In accordance with the present invention, there are provided circuits for providing pixel brightness correction in a monitor comprising logic means for generating upper bits of a data word representing pixel intensity, shifter means interfaced with the logic means for generating lower bits of a data word representing pixel intensity, and combining means interfaced with the logic means and the shifter means for generating intermediate bits of the data word representing pixel intensity.

Further in accordance with the present invention, there are provided methods of linearizing a graphics display device in a graphics system. The methods preferably comprise the steps of writing pixel value data to a cache memory, degamma correcting the pixel value data in the cache memory, combining the degamma corrected pixel value data with linear pixel value data according to an arithmetic raster operation, gamma correcting the degamma corrected pixel value data and the linear pixel value data, thereby producing gamma corrected pixel value data, rendering the gamma corrected pixel value data to a frame buffer, and tracing the gamma corrected pixel value data on a display device.

Further in accordance with the present invention, there are provided methods of data compression by converting data word input to the gamma correction according to a gamma correction equation which compresses the data to a smaller bit gamma corrected pixel value.

DETAILED DESCRIPTION OF PREFERRED EMBODIMENTS

Gamma correction circuitry provided in accordance with the present invention corrects for the gamma errors of computer monitors so that a linear intensity scale sent through the gamma corrections and then to the monitor will appear linear to the human eye viewing the graphics primitives. In preferred embodiments degamma correction is the inverse of gamma correction, and gamma correction in accordance with the present invention provides a data compression process which takes a 10- bit pixel intensity word from a pixel processor and compresses it into an 8-bit pixel intensity word to be stored on the frame buffer.

Figure 1:
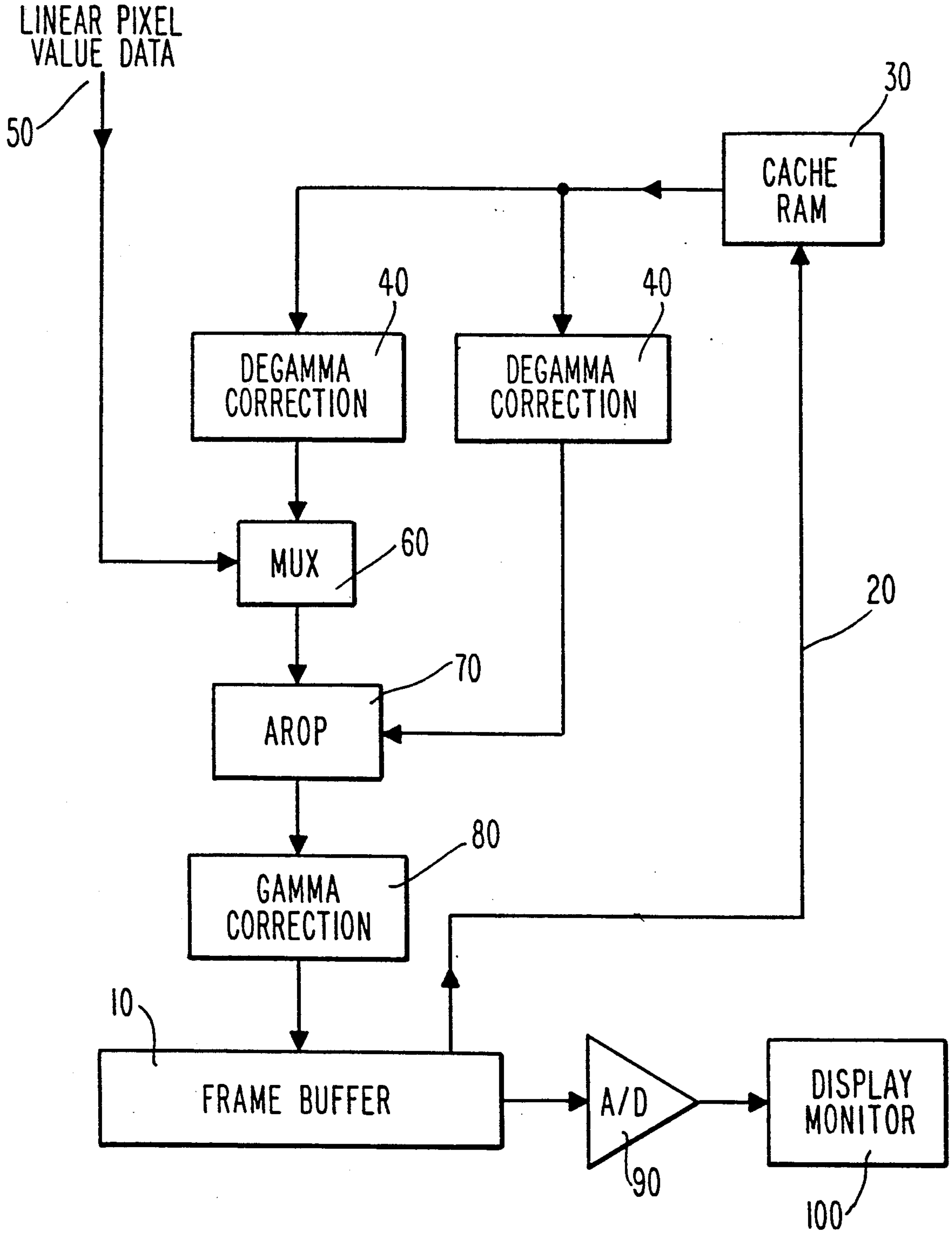
FIG. 1 is a block diagram of a graphics frame buffer system which utilizes degamma correction and gamma correction circuitry provided in accordance with the present invention.

As shown in FIG. 1, pixel value data including pixel intensity is stored on a frame buffer shown generally at 10. Since compositing operations, for example, anti-aliasing and texturing require linear values before the pixel value data which comprises pixel intensity data is gamma corrected, the pixel value data must first be degamma corrected by the system. In order to accomplish degamma correction, pixel value data is bussed along bus 20 to a cache RAM 30 where the data is stored. In order to maximize the effective numbers of colors in the pixel intensity, gamma correction must be performed on the existing pixel value data before the data is stored on the frame buffer.

Degamma correction circuits 40 are also provided to the system. While two degamma correction units are shown, it will be recognized by those with skill in the art that additional degamma correction units could be provided to the system to receive additional data from different stages in the data pipeline.

Linear pixel value data 50 is input to the system from a pixel processor (not shown). The pixel processor generally provides transform operations and graphics manipulations for the system so that understandable data can be eventually rendered to the frame buffer 10 and display screen. The linear pixel value data 50 is input to a multiplexer 60 where the degamma corrected data from degamma correction units 40 is simultaneously accessed. Linear pixel value data and degamma corrected pixel data values from degamma correction units 40 are then input to an arithmetic raster operation (AROP) unit 70 where the multiplexed degamma pixel value data and linear pixel value data are combined before gamma correction. The degamma correction circuits 40 convert the 8-bit gamma corrected data to 10-bit degamma corrected data in preferred embodiments for the combining operation with the linear pixel value data in AROP 70. After AROP 70 combines the 10-bit gamma corrected and linear pixel value data, gamma correction unit 80 performs gamma correction on the combined data.

In preferred embodiments of gamma correction units provided in accordance with the present invention, the 10-bit data word input to gamma correction unit 80 is converted to 8-bit gamma corrected pixel value data according to the gamma correction equation. This operation provides gamma corrected pixel value intensity data which is then restored on frame buffer 10. In still further preferred embodiments, an analog to digital converter 90 is interfaced with frame buffer 10 which takes data from serial and refresh ports of frame buffer 10, converts it to digital data, and then busses the color pixel value data and pixel intensity data to display monitor 100 wherein the graphics primitives made up of the pixel value data are traced on the display monitor screen. This process allows production of a coherent image which is recognizable by the system user and which is displayed on display monitor 100.

With methods and apparatus provided in accordance with the present invention, a more complex gamma equation than the classic gamma equation discussed earlier may be used in preferred embodiments. This modified gamma equation is represented as:

$$I=(k_1v+k_2)$$

where $k_1$ and $k_2$ are constants. For a Sony Corporation 16-inch color monitor, $k_1=1.10$, $k_2=-0.10$, and $=2.24$. For a Sony Corporation 19-inch color monitor, $k_1=1.23$, $k_2=-0.23$, and $=2.24$.

With the above-modified gamma correction equation, the 10-bit to 8-bit gamma correction circuit provided in accordance with the present invention yields the following gamma corrected (GC) equations:

| | | |
|---|---|---|
| gc | x | if x < 64 |
| | 64 + (x/2) mod 32 | if x < 128 |
| | 64 + (x/4) mod 64 | if x < 256 |
| | 128 + (x/4) mod 64 | if x < 512 |
| | 192 + (x/8) mod 64 | if x ≧ 512. |

With degamma correction circuitry provided in accordance with the present invention, 8-bit to 10-bit degamma correction (DGC) equations are denoted in preferred embodiments as:

| | | |
|---|---|---|
| | x | if x < 64 |
| | 64 + (x mod 32)*2 | if x < 96 |
| dgc = | 128 + (x mod 32)*4 | if x < 128 |
| | 256 + (x mod 64)*4 | if x < 192 |
| | 512 + (x mod 64)*8 | if x ≧ 192. |

Figure 2:
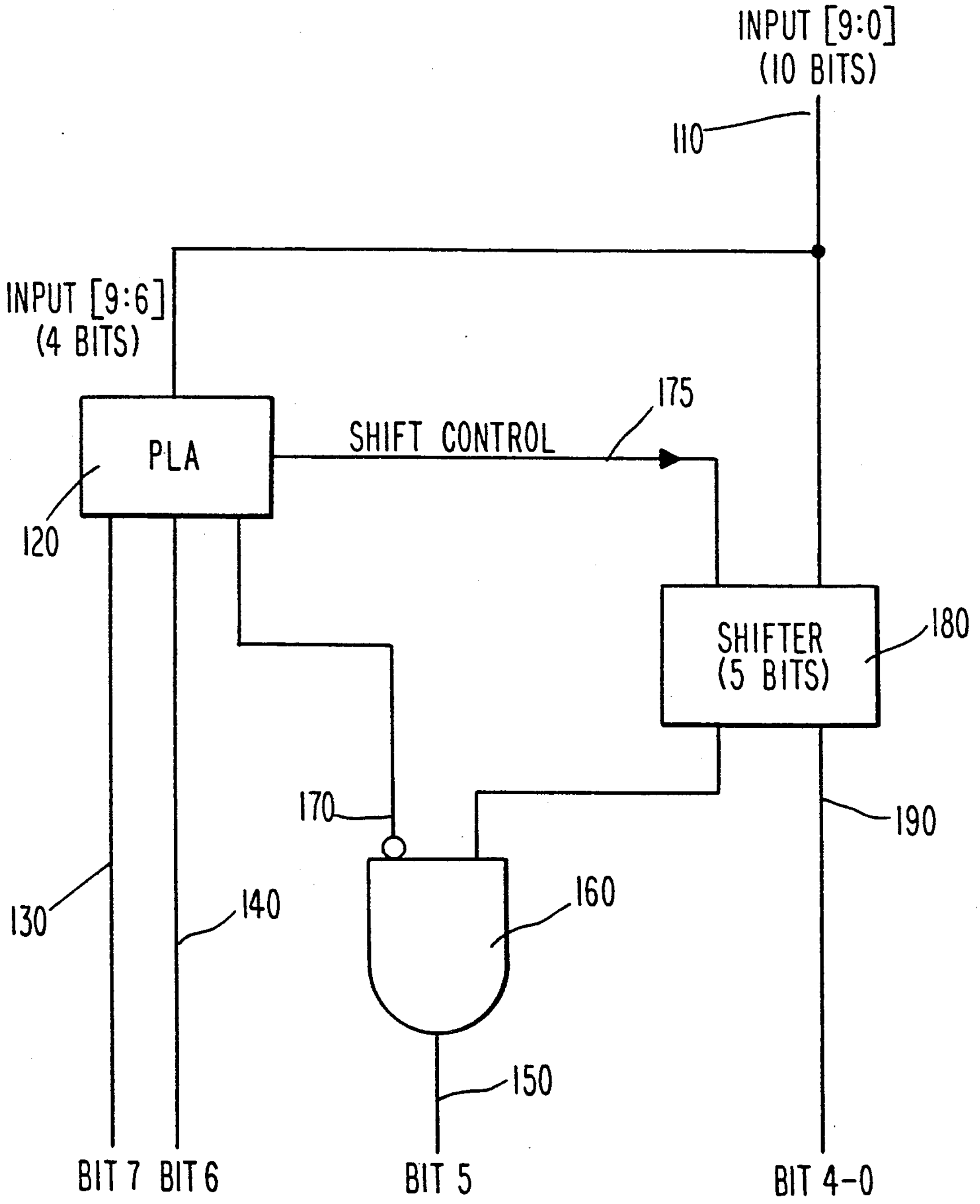
FIG. 2 is a gamma correction circuit provided in accordance with the present invention.

Gamma and degamma correction circuits provided in accordance with the present invention are piece-wise linear approximation circuits which solve the modified gamma equation discussed above. As shown in FIG. 2, a preferred embodiment of a gamma correction circuit takes a 10-bit input 110 which is bussed to the gamma correction circuit from a pixel processor and corresponds to the desired linear values of pixel intensity on the monitor. Logic means 120 is interfaced to input 110. In preferred embodiments, logic means 120 is any generally purpose, high speed logic array and is adapted to accept four bits of input. Logic means 120 is preferably a series of individual high speed logic elements. In still further preferred embodiments, logic means 120 is a programmable logic array or "PLA." PLA 120 preferably detects the input range of the desired 8-bit data word and generates the upper bits of the pixel value data corresponding to the pixel data word representing pixel intensity.

PLA 120 outputs a seventh bit 130 and a sixth bit 140 of the pixel data word representing pixel intensity to the monitor. A fifth bit 150 of the data word is output by combining means 160. In preferred embodiments, combining means 160 is an AND gate which has two inputs. A first input 170 of the AND gate 150 is an inverting input and is interfaced to accept a single bit input from PLA 120.

PLA 120 also outputs shift control bits 175 which controls shifter means 180 which in preferred embodiments is an 8-bit shift register commonly available in the computer industry. Shift control bits 175 control shifter 180 and determine when shifter 180 shifts bits to the 4-bit output 190. Shifter 180 outputs the lower bits of the data word representing pixel intensity, while AND gate 160 outputs an intermediate fifth bit of the data word.

In still further preferred embodiments of gamma correction circuits provided in accordance with the present invention, shifter 180 provides lower bits 190 of the data word multiplied by a power of 2. The following table illustrates the input range of the degamma correction circuit of FIG. 2 and the output range of the circuit given the specific input range:

TABLE 1

| Input Range | Output |
|---|---|
| 0–63 | input[5:0] |
| 64–127 | 64 + input[6:1] |
| 128–256 | 96 + input[7:2] |
| 256–511 | 128 + input[7:2] |
| 512–1023 | 192 + input[8:3] |

Table 1 shows the possible input ranges of the 10-bit input word 110 and the available output range for the 8-bit data word representing pixel intensity. The bracketed numbers, for example, input [5:0], represent the particular enabled bits of the data word.

Table 2 below illustrates the desired logic configuration of PLA 120 in the gamma correction circuit of FIG. 2:

TABLE 2

| PLA | | | Shifter | |
|---|---|---|---|---|
| Input[9:6] | Bit 7 | Bit 6 | Clear Bit 5 | Output |
| 0000 | 0 | 0 | 0 | input[5:0] |
| 0001 | 0 | 1 | 1 | input[6:1] |
| 001x | 0 | 1 | 0 | input[7:2] |
| 01xx | 1 | 0 | 0 | input[7:2] |
| 1xxx | 1 | 1 | 0 | input[8:3] |

The left-hand column of Table 2 illustrates the 4-bit input to PLA 120 and the last four columns illustrate the output data word from the gamma correction circuit of FIG. 2 in preferred embodiments. The output data word illustrated represents the gamma corrected pixel data intensity for the particular 10-bit to 8-bit gamma correction equation discussed above. Since gamma correction is performed in accordance with the present invention before the pixels are placed on the frame buffer and are computed with the gamma correction circuit of FIG. 2 rather than merely looked up on a ROM table, gamma correction circuitry provided in accordance with the present invention provides fast and efficient gamma correction allowing compositing operations to be performed with the desired linear values of pixel value data intensity on the monitor.

Figure 3:
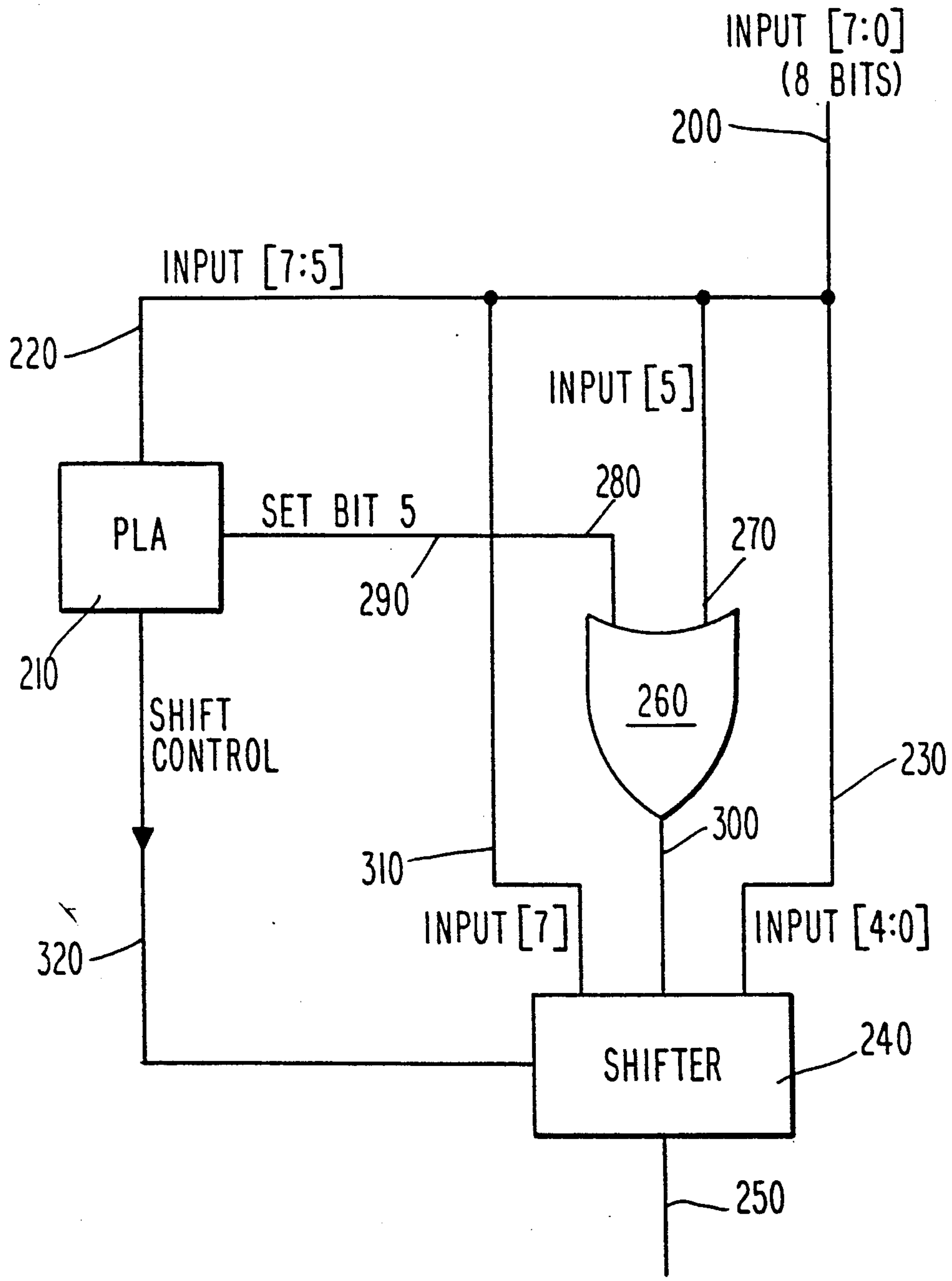
FIG. 3 is a degamma correction circuit provided in accordance with the present invention.

FIG. 3 illustrates a preferred embodiment of a degamma correction circuit provided in accordance with the present invention which accepts an 8-bit input at 200 which corresponds to gamma corrected pixel intensity values from cache RAM 30 and frame buffer 10. Logic means 210 in preferred embodiments accepts a 3-bit input 220. Logic means 210 is preferably any fast, general purpose logic array and is more preferably a programmable logic array. In still further preferred embodiments, logic means 210 comprises a series of high speed individual logic elements.

A 4-bit input 230 of the 8-bit input 200 is bussed to shifter means 240. Shifter means 240 is preferably any standard shift register available from the industry which outputs a 10-bit output word shown generally at 250. Combining means 260 has two input ports 270 and 280 and preferably accepts one bit of information from input word 200 at port 270 and a set bit 290, at port 280. In preferred embodiments, logic means 260 is an OR gate and outputs an OR signal 300 to shifter 240. Shifter 240 is also adapted to directly receive a single bit 310 directly from 8-bit input data word 200. PLA 210 also inputs shift control bits 320 to shifter 240 so that shifter 240 may output the 10-bit degamma corrected data word 250 at desired intervals.

Table 3 illustrates the input and output ranges of the degamma correction circuit given the 8-bit data word 200 as input:

TABLE 3

| Input Range | Output |
|---|---|
| 0–63 | input[5:0] |
| 64–95 | 64 + input[4:0]*2 |
| 96–128 | 128 + input[4:0]*4 |
| 128–191 | 256 + input[5:0]*4 |
| 192–255 | 512 + input[5:0]*8 |

The same explanatory notation as used in Table 1 is applicable to Table 3.

Furthermore, Table 4 illustrates the logic of PLA 210 given the 3-bit input 220:

TABLE 4

| PLA Input | Set Bit 5 | Shifter Output |
|---|---|---|
| 00x | 0 | (input[7], input[5:0]) |
| 010 | 1 | (input[7], input[5:0])*2 |
| 01x | 1 | (input[7], input[5:0])*4 |
| 10x | 0 | (input[7], input[5:0])*4 |
| 11x | 0 | (input[7], input[5:0])*8 |

Similar notation is applicable to Table 4 as was used in referring to Table 2. As is shown in Tables 2 and 4, the shifter circuits provide the lower bits for the gamma circuit of the output data words multiplied by a power of 2 in preferred embodiments. In the degamma circuit the shifter provides all of the output bits.

Gamma and degamma correction circuits in accordance with the present invention provide extremely fast hardware implementations which allow arithmetic operations on linearly rendered input data so that gamma corrected pixel data values can be stored on a frame buffer. Gamma and degamma correction circuitry claimed and disclosed herein use only the shift logic circuits 180 and 240 to perform an approximation to the modified gamma function discussed above which is generally useful for viewing or storing gamma and degamma data in a frame buffer having limited precision. Furthermore, gamma and degamma correction circuits provided in accordance with the present invention shift the lower order bits of intensity based on the upper bits of the input.

Therefore, gamma correction circuits provided in accordance with the present invention provide a large cost reduction over previous gamma correction schemes in graphics frame buffer systems. Gamma circuitry described herein eliminates use of a ROM color map but still obtains gamma corrected true color images in low end graphics frame buffer systems. Furthermore, gamma correction circuitry provided in accordance with the present invention may be used instead of the ROM look-up table prior to storing gamma corrected data in the frame buffer, after which the gamma corrected data can be further approximated and corrected in the color map. Additionally, methods and apparatus described herein achieve a desirable data compression from a 10-bit to an 8-bit gamma corrected word to reduce costly hardware data registers.

There have thus been described certain preferred embodiments of methods and apparatus for providing gamma corrected pixel data for monitors in graphics frame buffer systems. While preferred embodiments have been described and disclosed, it will be recognized by those with skill in the art that modifications are possible within the true spirit and scope of the invention. The appended claims are intended to cover all such modifications.

What is claimed is:

1. A circuit for providing gamma correction of an input to a monitor, comprising:

logic means responsive to said input for directly generating upper bits of a gamma corrected data word representing pixel intensity;

shifter means responsive to the logic means and said input for directly generating lower bits of the gamma corrected data word representing pixel intensity; and combining means responsive to an output of the logic means and an output of the shifter means for directly generating intermediate bits of the gamma corrected data word representing pixel intensity, said gamma corrected data word being output to said monitor for display.

2. The circuit recited in claim 1 wherein the logic means is a programmable logic array integrated circuit which calculates an approximation to said gamma correction.

3. The circuit recited in claim 2 wherein the programmable logic array circuit is adapted to generate two bits of data corresponding to at least two upper bits of the pixel intensity.

4. The circuit recited in claim 3 wherein the shifter means is adapted to generate five bits of data corresponding to the lower bits of the pixel intensity.

5. The circuit recited in claim 4 wherein the combining means is a logical AND gate adapted to receive at least one bit of data at an input port thereof corresponding to one of the four upper bits of pixel intensity data.

6. The circuit recited in claim 5 wherein one of the two input ports is an inverting input port.

7. The circuit recited inn claim 6 wherein the programmable logic array is programmed to provide gamma correction to the monitor.

8. The circuit recited inn claim 2 wherein the combining means is a logical OR gate adapted to receive at least one bit of data at an input port thereof corresponding to one upper bit of pixel intensity data.

9. The circuit recited in claim 8 wherein the programmable logic array is programmed to provide degamma correction to the monitor.

10. A graphics systems for displaying graphics primitives comprising:

display means for displaying pixel value data corresponding to the graphics primitives;

frame buffer means interfaced with the display means for storing the pixel value data;

degamma correction means interfaced with the frame buffer means for providing degamma correction of the pixel value data stored in the frame buffer means;

arithmetic combination means interfaced with the degamma correction means for combining degamma corrected pixel value data with linear pixel value data; and gamma correction means interfaced with the frame buffer means for gamma correcting the degamma corrected linear pixel value data and rendering the gamma corrected pixel value data to the frame buffer.

11. The system recited in claim 10 wherein the gamma correction means comprises:

logic means for generating upper bits of a data word representing pixel intensity;

shifter means interfaced with the logic means for generating lower bits of the data word representing pixel intensity; and combining means interfaced with the logic means and the shifter means for generating intermediate bits of the data word representing pixel intensity.

12. The system recited in claim 11 wherein the logic means is a programmable logic array integrated circuit which calculates ann approximation to the gamma corrected pixel value data.

13. The system recited in claim 12 wherein the programmable logic array circuit is adapted to generate two bits of data corresponding to at least two upper bits of the pixel intensity.

14. The system recited in claim 13 wherein the shifter means is adapted to generate five bits of data corresponding to the lower bits of the pixel intensity.

15. The circuit recited in claim 14 wherein the combining means is a logical AND gate adapted to receive at least one bit of data at ann input port thereof corresponding to one upper bit of pixel intensity data.

16. The system recited in claim 15 wherein one of the two input ports is an inverting input port.

17. The system recited in claim 10 wherein the degamma correction means comprises:

logic means for generating upper bits of a data word representing pixel intensity;

shifter means interfaced with the logic means for generating lower bits of the data word representing pixel intensity; and combining means interfaced with the logic means and the shifter means for generating intermediate bits of the data word representing pixel intensity.

18. The circuit recited in claim 17 wherein the logic means is a programmable logic array integrated circuit which calculates ann approximation to the degamma corrected pixel value data.

19. The system recited in claim 18 wherein the programmable logic array circuit is programmed to generate four bits of data corresponding to the upper bits of the pixel intensity.

20. The system recited in claim 19 wherein the shifter means is adapted to generate four bits of data corresponding to the lower bits of the pixel intensity.

21. The system recited in claim 20 wherein the combining means is a logical OR gate adapted to receive at least one bit of data at an input port thereof corresponding to one upper bit of pixel intensity data.

22. The system recited in claim 10 further comprising:

multiplexing means interfaced with the arithmetic combination means and degamma correction means for simultaneously accessing the linear pixel value data and degamma corrected pixel value data.

23. The system recited in claim 22 further comprising:

cache means interfaced with the degamma correction means and the frame buffer means for storing gamma corrected pixel value data before the pixel value data is degamma corrected by the degamma correction means.

24. The system recited in claim 23 further comprising:

analog to digital conversion means interposed between the display means and the frame buffer means for converting the gamma corrected pixel value data to digital signals adapted to stimulate the display means.

25. A method of linearizing a graphics display device in a graphics system comprising the steps of:

writing pixel value data to a cache memory;

degamma correcting the pixel value data in the cache memory;

combining the degamma corrected pixel value data with linear pixel value data according to an arithmetic raster operation;

gamma correcting the combined degamma corrected pixel value data and the linear pixel value data, thereby producing gamma corrected pixel value data;

rendering the gamma corrected pixel value to a frame buffer; and tracing the gamma corrected pixel value data on the display device.

26. The method recited in claim 25 further comprising the step of:

multiplexing the degamma corrected pixel value data and the linear pixel value data before the linear pixel value data and the degamma corrected pixel value data are arithmetically combined.

27. The method recited in claim 26 further comprising the step of:

converting the gamma corrected data to analog data with an analog to digital converter before the gamma corrected data is traced on the display device.

* * * * *